Sept. 17, 1929.  M. C. SCROTE  1,728,511
TREAD APPLYING DEVICE FOR TIRE MAKING MACHINES
Filed Oct. 25, 1927  2 Sheets-Sheet 1
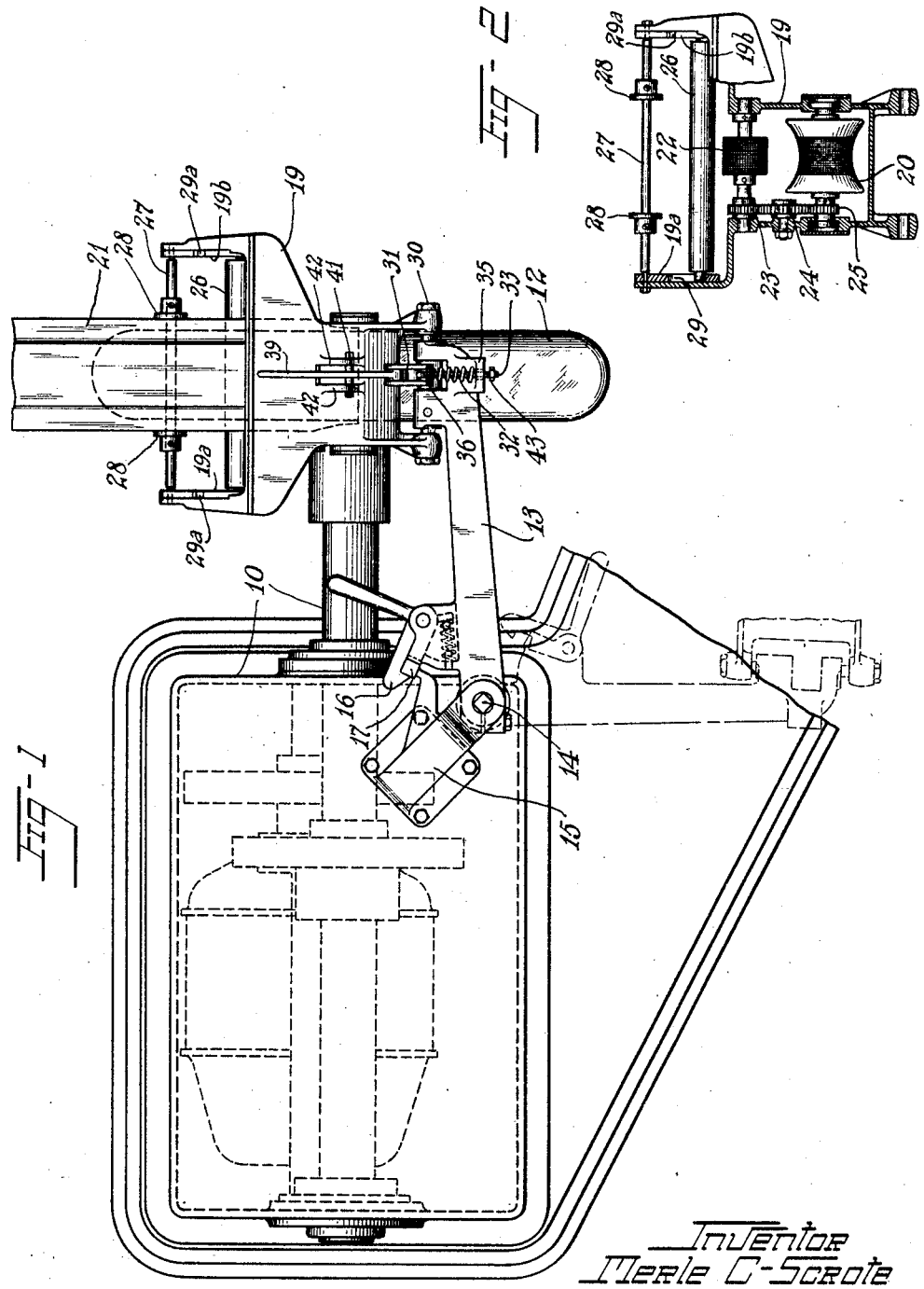
Inventor
Merle C. Scrote
By Pierson, Eskin & Avery
Attys.

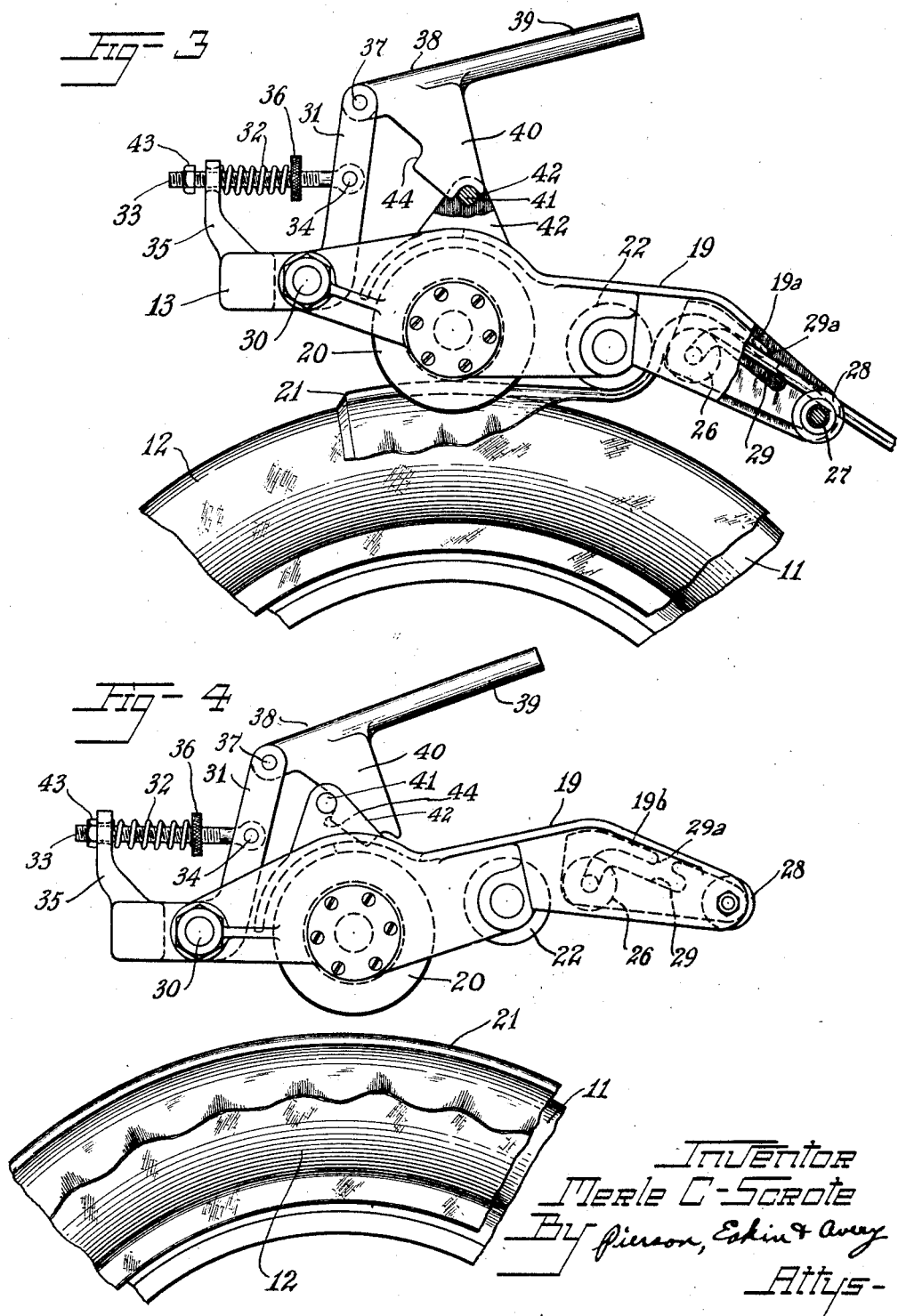

Patented Sept. 17, 1929

1,728,511

UNITED STATES PATENT OFFICE

MERLE C. SCROTE, OF KENMORE, OHIO, ASSIGNOR TO THE B. F. GOODRICH COMPANY, OF NEW YORK, N. Y., A CORPORATION OF NEW YORK

TREAD-APPLYING DEVICE FOR TIRE-MAKING MACHINES

Application filed October 25, 1927. Serial No. 228,606.

This invention relates to devices for applying a tread strip to the carcass of a pneumatic tire built upon a core and its chief objects are to provide lightness and ease of operation in such a device in conjunction with efficiency in the matter of stretching the middle portion of the tread strip as it goes onto the carcass, to give it a trough shape, and in the matter of pressing a roller against the tread strip to compact it against the carcass and to provide a suitable drive-resistance for hold-back means adapted to impart the desired stretch to the strip.

Of the accompanying drawings:

Fig. 1 is a plan view of a tire-making machine embodying my invention in its preferred form.

Fig. 2 is a horizontal section of parts of the tread-applying device.

Fig. 3 is a side elevation of the tread-applying device in its operative relation to the tire-building core and the work thereon, the parts being sectioned and broken away.

Fig. 4 is a similar view showing the tread-applying device in inoperative position.

Referring to the drawings, the machine comprises a device 10 of known construction for supporting and rotating a tire-building core 11 for the building of a tire carcass 12 thereon.

For supporting the tread-applying device a large arm 13 is rotatably mounted upon a post 14 rising from the frame of the core-rotating device and braced at its upper end by a bracket 15 rising from the said frame. The said arm is provided with a cam latch 16 adapted to coact with a detent 17 formed on the bracket 15, to hold the tread-applying device in its operative position, shown in full lines in Fig. 1, the device being adapted to be swung to the inoperative position which is shown in broken lines in Fig. 1.

The tread-applying device itself comprises a forked frame member 19 between the fork portions of which are journaled a waisted, knurled, tread-pressing roller 20 adapted to run upon the work at the position where the tread strip 21 is applied to the carcass, a knurled hold-back roll 22 having drive connection with the pressing roll 20 through gears 23, 24, 25 (Fig. 2), and guide-rollers 26 and 27 adapted to guide the tread strip to the hold-back roll 22, the guide-roll 26 being so positioned as to cause the strip to pass for a substantial distance in contact with the hold-back roll, and the roll 27 being provided with a pair of guide-flange collars 28, 28 secured thereon for maintaining alignment of the tread strip. The forks of the frame member 19 are provided with journal plates $19^a$, $19^b$ in which the guide-roll 26 is journaled, its journals being mounted in L-shaped slots such as the slot 29 shown in Fig. 3, so that the roll 26 may be readily moved away from the hold-back roll 22 for the insertion of the tread strip between the two and may then be run back into the downwardly turned portions of the slots adjacent the roll 22 to provide the desired abrupt flexing of the tread strip about the hold-back roll 22. The slots 29 may be open to the margins of the journal plates $19^a$, $19^b$ as shown at $29^a$, $29^a$ to permit rolls of different sizes to be readily substituted.

The frame and permissibly the several rolls and other parts of the device are made of light material such as aluminum or an aluminum alloy in order that the device may be readily lifted, the frame being hinged to the arm 13 by means of a shaft 30.

The lightness of the device is such that a force additional to its weight is desirable for assuring the proper pressure of the roll 20 against the work to compel the hold-back roll 22 to rotate with a slower peripheral speed than that of the roll 20, to impart the desired speed to the tread strip, and also to obtain the desired compacting of the strip against the carcass.

The preferred means employed for applying such additional force to the device comprises an arm 31 hinged upon the shaft 30 and urged toward the tread-applying device by a compression spring 32 surrounding a bolt 33 which is hinged to the arm 31 at 34 and extends through an aperture in a bracket 35 rising from the arm 13, the spring 32 being interposed between the bracket 35 and an adjustment nut 36 mounted upon the bolt 33.

Hinged at 37 upon the outer end of the arm 31, which is here shown as a double arm, is a latching member 38 having a handle 39 and formed with a latching plate 40 having a notched outer end adapted to seat upon a cross-bar 41 extending between a pair of brackets 42, 42 formed upon the frame member 19, to urge the latter downward under the force of the compression spring 32. To prevent the force of the spring 32 from being applied to press the knurled roll 20 against the tire carcass 12 when the tread strip 21 is not interposed between them a stop-nut 43 is mounted upon the outer end of the bolt 33 and is adapted to abut the bracket 35, and the setting of the adjustable nut 36 upon the bolt 33 is such as to maintain the spring under considerable compression even when the stop-nut 43 is in contact with the bracket 35, so that when the tread strip 21 is started between the presser roll 20 and the carcass and the stop-nut 43 is thus forced away from the bracket 35, as shown in Fig. 3, with the cross bar 41 engaged in the end notch of the latch 40 the spring 32 will exert a high pressure although the shortening of the spring by the inter-position of the tread strip is not very great.

The latching plate 40 is formed on its under side with a shoulder 44 adapted to engage the bar 41 as shown in Fig. 4, to latch the frame 19 in elevated position, with the stop-nut 43 against the bracket 35 sustaining the weight of the device, while the device is swung with its arm 13 to the broken line position of Fig. 1 and back again to operative position for the application of a succeeding tread strip.

The operation of the device will be clear from the foregoing description.

My invention provides a simple and compact structure with the several advantages set out in the above statement of objects.

Modifications are possible within the scope of my invention as defined by the appended claims.

I claim:

1. A tread-applying device comprising a rotatably supported tire-building core, a frame mounted for movement toward and from the core, a mounting for the frame, a drive roll and a hold-back roll having the said frame as a common mounting, the drive roll being adapted to guide a tread slab onto and press it against a tire carcass mounted on the core and to be held in pressing relation to the work by the said frame, means operatively connecting the two said rolls to compel the hold-back roll to rotate with slower peripheral speed than that of the drive roll, means including a spring for urging the said frame toward the core, and means for limiting the range of the spring's action.

2. A device as defined in claim 1 in which the frame is pivoted on an axis substantially parallel with the core's axis of rotation for movement from and toward the core and in which a latch and a spring are interposed operatively between the frame and its mounting for holding the frame in such proximity to the work as to cause the drive roll to press the tread slab against the carcass.

3. A tread-applying device comprising a rotatably supported tire-building core, a frame pivoted thereover, a mounting for said frame, a drive roll and a hold-back roll journaled on said frame, the drive roll being adapted to be held against the work by said frame, means operatively connecting the two said rolls to compel the hold-back roll to rotate with slower peripheral speed than that of the drive roll, a member pivoted concentrically with the frame, and a spring interposed between the frame's mounting and the said member and a latching member interposed between the said member and the frame for holding the frame in proximity to the core.

4. A device as defined in claim 3 in which the latching member is formed with an abutment face for alternatively holding the frame in an elevated position.

5. A tread-applying device comprising a rotatably supported tire core, a presser roller adapted to run upon a tread strip to press the same against a tire carcass mounted on the core, means for supporting the roller closely adjacent but out of contact with the carcass, and a spring so associated with said means and so held under stress against a stop which holds the roller in such position as to be put under further stress by movement of the roller away from the core.

In witness whereof I have hereunto set my hand this 20th day of October, 1927.

MERLE C. SCROTE.